United States Patent
Yoon

(10) Patent No.: US 10,144,429 B2
(45) Date of Patent: Dec. 4, 2018

(54) METHOD FOR CONTROLLING GEAR SHIFT PATTERN AND ENGINE SPEED OF VEHICLE

(71) Applicant: HYUNDAI MOTOR COMPANY, Seoul (KR)

(72) Inventor: Young Min Yoon, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 327 days.

(21) Appl. No.: 15/142,985

(22) Filed: Apr. 29, 2016

(65) Prior Publication Data
US 2017/0120914 A1 May 4, 2017

(30) Foreign Application Priority Data

Nov. 2, 2015 (KR) ........................ 10-2015-0153127

(51) Int. Cl.
| | |
|---|---|
| *B60W 10/02* | (2006.01) |
| *B60W 10/06* | (2006.01) |
| *B60W 10/11* | (2012.01) |
| *F16H 61/02* | (2006.01) |
| *B60W 30/182* | (2012.01) |
| *B60W 30/186* | (2012.01) |
| *B60W 30/188* | (2012.01) |

(52) U.S. Cl.
CPC .......... *B60W 30/188* (2013.01); *B60W 10/02* (2013.01); *B60W 10/06* (2013.01); *B60W 10/11* (2013.01); *B60W 30/182* (2013.01); *B60W 30/186* (2013.01); *B60W 2510/0291* (2013.01); *B60W 2520/10* (2013.01); *B60W 2710/021* (2013.01); *B60W 2710/025* (2013.01); *B60W 2710/0644* (2013.01); *B60W 2710/1005* (2013.01); *F16H 2061/0227* (2013.01)

(58) Field of Classification Search
None
See application file for complete search history.

(56) References Cited

U.S. PATENT DOCUMENTS

| | | | |
|---|---|---|---|
| 9,975,546 B2 * | 5/2018 | Kim | B60W 20/40 |
| 2011/0029207 A1 * | 2/2011 | Sasahara | F16D 48/06 701/56 |
| 2014/0222269 A1 * | 8/2014 | Tsutsumi | B60W 20/40 701/22 |

(Continued)

FOREIGN PATENT DOCUMENTS

| | | |
|---|---|---|
| JP | H09-296834 A | 11/1997 |
| JP | 2009-138768 A | 6/2009 |

(Continued)

OTHER PUBLICATIONS

Korean Office Action issued in corresponding Korean Patent Application No. 10-2015-0153127, dated Nov. 25, 2016.

*Primary Examiner* — Jacob S. Scott
(74) *Attorney, Agent, or Firm* — McDermott Will & Emery LLP

(57) ABSTRACT

A control method of a vehicle includes executing one of a plurality of clutch protection logics according to estimated clutch temperatures by a controller. A control constant is counted according to the executed clutch protection logic by the controller. At least one of a shift pattern and an engine revolutions per minute (RPM) are adjusted based on the counted control constant.

6 Claims, 3 Drawing Sheets

(56) References Cited

U.S. PATENT DOCUMENTS

2015/0203104 A1* 7/2015 Haneda .................. B60K 6/445
                                                                701/22
2016/0084375 A1* 3/2016 Yoon ................... F16H 61/0213
                                                                701/55

FOREIGN PATENT DOCUMENTS

| JP | 2015-086953 A | 5/2015 |
| KR | 10-2004-0049333 A | 6/2004 |
| KR | 10-2012-0022448 A | 3/2012 |
| KR | 10-2014-0079155 A | 6/2014 |
| KR | 10-1473572 B1 | 12/2014 |

\* cited by examiner

| STAGE | ENTRANCE TEMP VALUE | FUNCTION RESTRICTION | COUNTED VALUE |
|---|---|---|---|
| FIRST-STAGE | 200°C | HIGH TEMPERATURE PATTERN | a |
| SECOND-STAGE | 250°C | REDUCTION OF STARTING SLIP | b |
| THIRD-STAGE | 270°C | | c |
| FOURTH-STAGE | 300°C | SINGLE CLUTCH CONTROL | d |
| FIFTH-STAGE | TEMP VALUES OF CLUTCHES 1 & 2 BEING MORE THAN 300°C | OPENING OF CLUTCHES | e |

METHOD FOR CONTROLLING GEAR SHIFT PATTERN AND ENGINE SPEED OF VEHICLE

CROSS-REFERENCE TO RELATED APPLICATION

This application claims the benefit of priority to Korean Patent Application No. 10-2015-0153127, filed on Nov. 2, 2015 in the Korean Intellectual Property Office, the disclosure of which is incorporated herein by reference.

TECHNICAL FIELD

The present disclosure relates to a control method of a vehicle, and more particularly, to a method for controlling a gear shift pattern and an engine speed in which overheating of a vehicle clutch is prevented.

BACKGROUND

In general, a dual clutch transmission (DCT) is a type of automatic transmission for transmitting engine torque using dry clutches, which is different from a general automatic transmission having a torque converter and a wet multiple disk clutch. The dry clutch is difficult to cool during heat generation. When a temperature rises in the dry clutch, friction thereof remarkably decreases, thus causing difficulty in transmission of power. In addition, when the clutch continuously slips, the clutch becomes worn out, thus causing malfunction of the clutch.

The DCT may be implemented with various functions to protect the clutch from overheating. However, the implementation of these functions may restrict driving performance of the vehicle, and thus, it is necessary to prevent the vehicle from entering a clutch high temperature mode.

Therefore, a method for monitoring a driver's driving tendency, road conditions on which the driver mainly drives a vehicle, and a condition of a clutch and for controlling the clutch to secure durability and reliability has been proposed.

The above description has been provided to aid in understanding of the background of the present disclosure and should not be interpreted as conventional technology known to those skilled in the art.

SUMMARY

The present disclosure has been made in view of the above problems. An aspect of the present disclosure provides a control method of a vehicle in which a shift pattern or an engine revolutions per minute (RPM) is controlled based on the frequency of entrance to clutch protection logics according to estimated clutch temperatures so as to prevent overheating of clutches.

In accordance with an exemplary embodiment in the present disclosure, a method for controlling a gear shift pattern and an engine speed of a vehicle comprises executing one of a plurality of clutch protection logics according to estimated clutch temperatures through a controller. A control constant is counted according to the executed clutch protection logic. At least one of a shift pattern and an engine revolutions per minute (RPM) are adjusted based on the counted control constant.

In the step of executing the one of the clutch protection logics, the respective clutch protection logic may be executed if an estimated clutch temperature is higher than an entrance temperature value of the respective clutch protection logics.

In the step of counting the control constant, as the entrance temperature value of the executed clutch protection logic increases, the counted value of the control constant may increase.

In the step of adjusting the at least one of the shift pattern and the engine RPM, the controller may adjust an upshift pattern and a downshift pattern, so that as the control constant increases, upshift is executed at a vehicle speed higher than that of an existing shift pattern and downshift is executed at a vehicle speed lower than that of the existing shift pattern.

In the step of adjusting the at least one of the shift pattern and the engine RPM, the controller may adjust the engine RPM to be lower than an existing engine RPM when the control constant increases.

BRIEF DESCRIPTION OF THE DRAWINGS

The above and other objects, features and other advantages of the present disclosure will be more clearly understood from the following detailed description taken in conjunction with the accompanying drawings.

DETAILED DESCRIPTION

Reference will now be made in detail to exemplary embodiments in the present disclosure, examples of which are illustrated in the accompanying drawings. Wherever possible, the same reference numbers will be used throughout the drawings to refer to the same or like parts.

Figure 1:
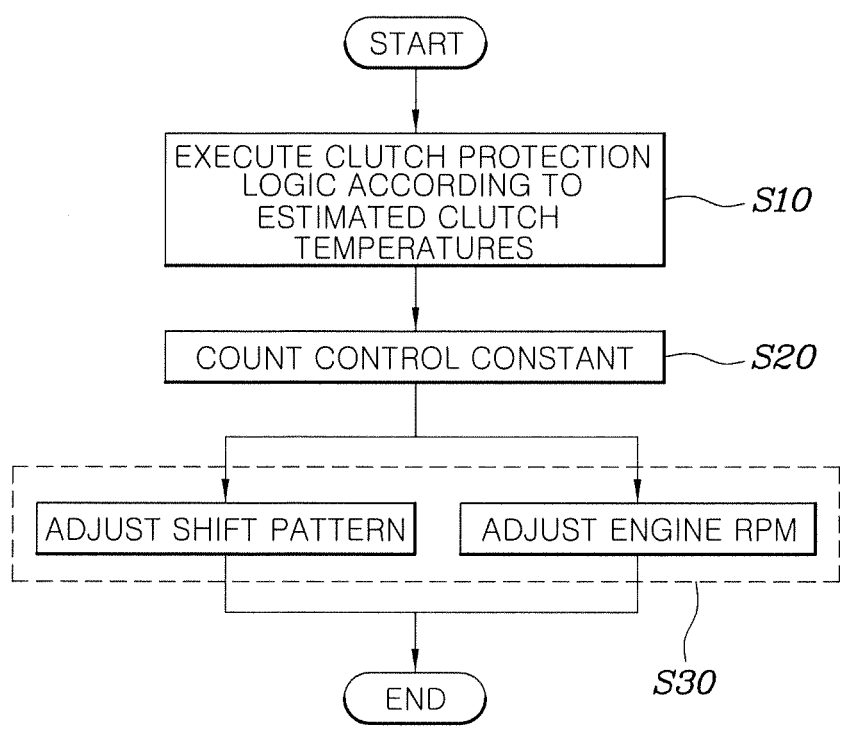
FIG. 1 is a flowchart illustrating a method for controlling a gear shift pattern and an engine speed of a vehicle in accordance with an embodiment in the present disclosure.
Figures 2, 3:
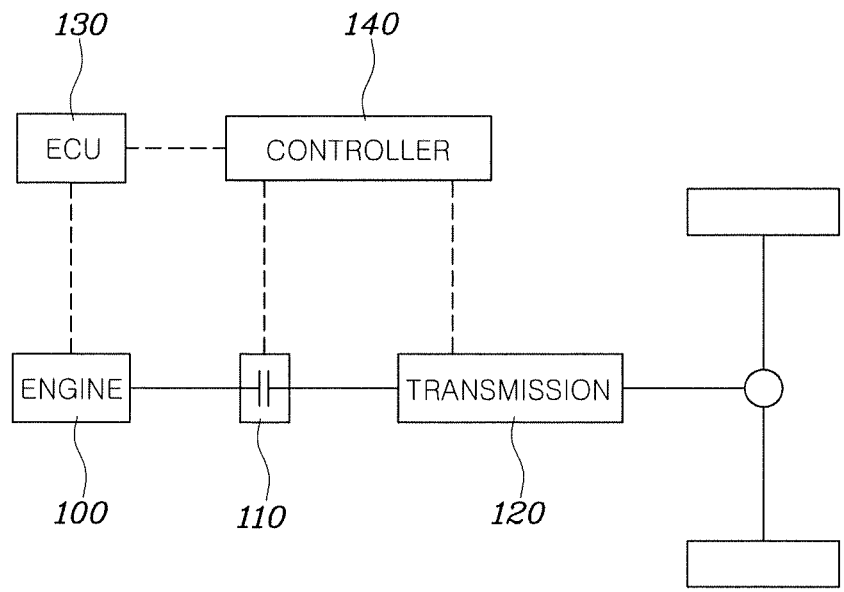
FIG. 2 is a block diagram illustrating an apparatus for controlling a gear shift pattern and an engine speed of a vehicle in accordance with an embodiment in the present disclosure.
FIG. 3 is a table showing a plurality of clutch protection logics in accordance with an embodiment in the present disclosure.

FIG. 1 is a flowchart illustrating a method for controlling a gear shift pattern and an engine speed of a vehicle in accordance with an embodiment in the present disclosure, and FIG. 2 is a block diagram illustrating an apparatus for controlling a gear shift pattern and an engine speed of a vehicle in accordance with an embodiment in the present disclosure.

With reference to FIGS. 1 and 2, a method for controlling a gear shift pattern and an engine speed of a vehicle may include executing one of a plurality of clutch protection logics according to estimated clutch temperatures by a controller 140 (S10). Then, a control constant is counted according to the executed clutch protection logic (S20). At least one of a shift pattern and an engine revolutions per minute (RPM) are adjusted based on the control constant by the controller 140 (S30).

The controller 140 receives characteristic values for estimating the temperatures of clutches 110 through an engine control unit (ECU) 130, a transmission 120, etc. to calculate the temperatures of the clutches 110. The controller 140 may estimate the temperatures of the clutches 110 based on the received characteristic values and execute one of the clutch protection logics to prevent overheating of the clutches 110. Various conventional methods for estimating the temperatures of the clutches 110 can used herein, and thus, a detailed description thereof will be omitted.

As described above, the controller 140 estimates the temperatures of the clutches 110 and executes one of the clutch protection logics based on the respective estimated clutch temperatures (S10). Here, the plurality of clutch protection logics may be executed in stages according to the estimated temperatures of the clutches 110.

In step S10, the clutch protection logics may be executed if the estimated clutch temperatures are higher than respective entrance temperature values.

For example, FIG. 3 is a table showing a plurality of clutch protection logics in accordance with an embodiment in the present disclosure. With reference to FIG. 3, it may be understood that the vehicle enters different protection logics according to estimated temperatures of the clutches 110. If the estimated temperature of at least one of the clutches 110 is higher than 200° C., a first-stage clutch protection logic is executed. If the estimated temperature of at least one of the clutches 110 is higher than 250° C., 270° C., and 300° C., second-stage, third-stage, and fourth-stage clutch protection logics may be executed, respectively. A fifth-stage clutch protection logic may be executed if the estimated temperatures of all of the clutches 110 are higher than 300° C.

The above-described respective clutch protection logics are set to reduce slip of the respective clutches 110, to execute control of one clutch 110, or to execute a function of releasing all clutches 110, thus preventing heat generated from the clutches 110. Entrance temperature values, release temperature values, and functions of the respective clutch protection logics stated in FIG. 3 only correspond to one exemplary embodiment, and thus, they may vary according to a manufacturer or a vehicle and are not limited to specific values.

The controller 140 in accordance with the present disclosure counts a control constant according to the executed clutch protection logic. That is, as the control constant increases, the temperatures of the clutches 110 increase more frequently and the clutch protection logics are more frequently executed. For example, if a driver has a driving tendency to perform abrupt acceleration and deceleration or mainly drives a vehicle on a rough road, the clutches 110 may be in a severe environment and the clutch protection logics may be frequently executed, thus increasing the control constant.

In step S20, as the entrance temperature value of the executed clutch protection logic increases, the counted value of the control constant may also increase.

That is, as the estimated temperature of the clutch 110 increases, the severity degree of the clutch 110 increases, and thus, a value of the control constant to be counted needs to be varied according to kinds of clutch protection logics. With reference to FIG. 3, the control constant is counted values of a, b, c, d, and e according to the respective clutch protection logics. As the stage of the clutch protection logic increases, the counted value of the control constant may increase (e>d>c>b>a). For example, among the clutch protection logics, when the first-stage clutch protection logic having the lowermost entrance temperature value is executed, the control constant may be counted as a value of 1. When the stage of the executed clutch protection logic increases, the control constant may be counted by adding 1 to the counted value of the control constant of the first stage clutch protection logic. Thus, the control constant value is increased. Here, the control constant is counted as only an example, and the control constant may be varied according to a vehicle and a manufacturer.

In step S30, an upshift pattern may be adjusted. Thus, as the control constant increases, upshift is executed at a vehicle speed higher than that of an existing shift pattern. That is, as the control constant increases, a time point at which the shift is executed becomes delayed even when the vehicle speed increases. Therefore, the upshift is not rapidly executed, even if the vehicle speed increases. Further, overheating of the clutch 110 caused by increase of the slip amount of the clutch 110 due to frequent generation of upshift may be prevented.

Figure 4:
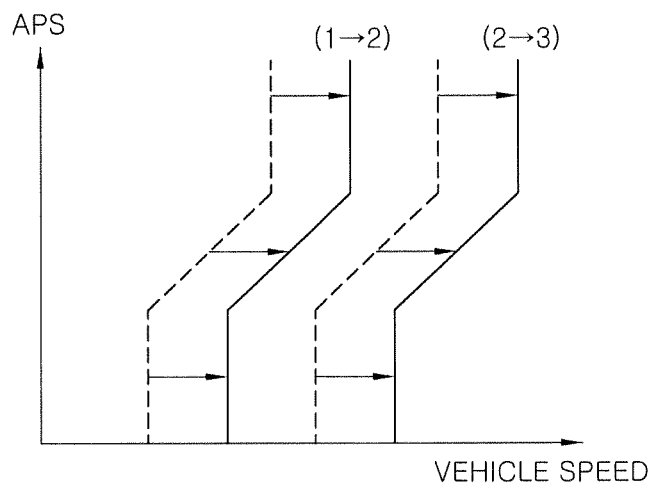
FIG. 4 is a graph illustrating adjustment of shift patterns in accordance with an embodiment in the present disclosure.

FIG. 4 is a graph illustrating adjustment of shift patterns in accordance with an embodiment in the present disclosure, in which a shift pattern shown by a dotted line means an existing shift pattern and a shift pattern shown by a solid line means an adjusted shift pattern.

It may be understood that, as a control constant increases, shift patterns are adjusted in a direction toward a higher vehicle speed. For example, a shift pattern to upshift from the first gear position to the second gear position and a shift pattern to upshift from the second gear position to the third gear position are adjusted in the higher vehicle speed direction. Other upshift patterns, which are not shown, may also be adjusted in the higher vehicle speed direction.

Further, in step S30, the controller 140 may adjust a downshift pattern. Thus, as the control constant increases, downshift is executed at a vehicle speed lower than that of the existing shift pattern.

That is, as the control constant increases, the frequency of abrupt acceleration and deceleration of the vehicle by the driver increases. Thus, driving of the engine in a high torque state is advantageous. For example, when the driver abruptly accelerates the vehicle, an open value of an accelerator position sensor (APS) and the vehicle speed increase and kickdown shift to a low shift position may be generated. However, when a downshift pattern is adjusted in such a manner, the frequency of kickdown shift and overheating of the clutch 110 may decrease by reduction of a slip amount of the clutch 110 due to the kickdown shift.

Therefore, as the control constant increases, upshift and downshift patterns are adjusted according to vehicle speeds, as described above, thus minimizing the overheating of the clutch 110 due to slip of the clutch 110 in severe environments.

Further, in adjusting at least one of the shift pattern or the engine RPM, the controller 140 may adjust the engine RPM so as to be lower than an existing engine RPM as the control constant increases.

Figure 5:
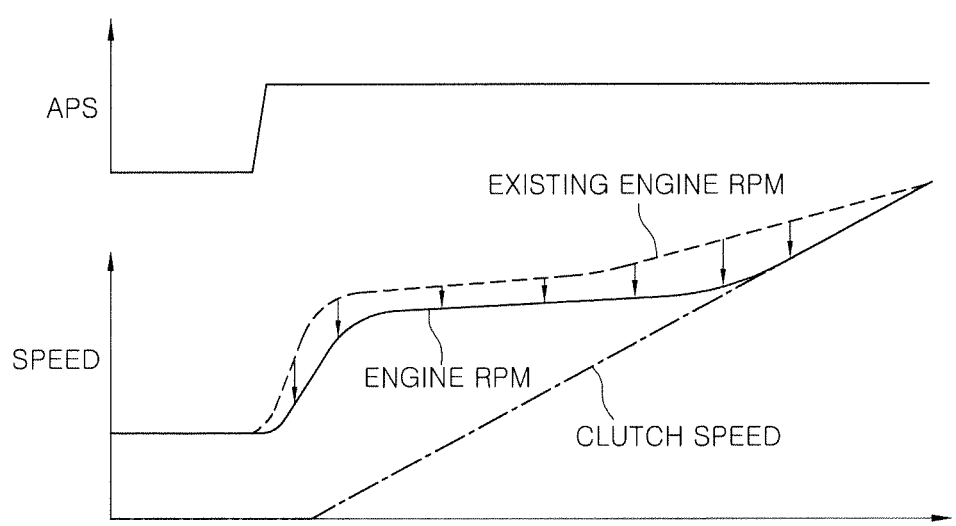
FIG. 5 is a graph illustrating adjustment of an engine RPM in accordance with an embodiment in the present disclosure.

FIG. 5 is a graph illustrating adjustment of an engine revolutions per minute (RPM) in accordance with an embodiment in the present disclosure. With reference to FIG. 5, as an open value of an APS increases, both the engine RPM and the clutch speed increase. In the graph shown in FIG. 5, an area between an engine RPM line and a clutch speed line may correspond to a slip amount.

That is, as the control constant increases, an engine RPM decreases from the existing engine RPM so as to reduce a speed difference with a clutch speed and to cause the engine RPM and the clutch speed to match within a short period of time, thus minimizing the slip amount of the clutch 110. Thereby, heat generated from the clutch 110 may be minimized.

As is apparent from the above description, in the method for controlling a gear shift pattern and an engine speed of a vehicle in accordance with the present disclosure, a shift pattern of the vehicle or an engine RPM may be adjusted according to the frequency of entrance to clutch protection logics, thereby preventing overheating of clutches and damage to the clutches.

Although the exemplary embodiments in the present disclosure have been disclosed for illustrative purposes, those skilled in the art will appreciate that various modifications, additions, and substitutions are possible, without departing from the scope and spirit of the invention as disclosed in the accompanying claims.

What is claimed is:

1. A control method of a vehicle, the control method comprising steps of:
   executing, by a controller, one of a plurality of clutch protection logics according to estimated clutch temperatures;
   counting, by the controller, a control constant according to the executed clutch protection logic; and
   adjusting, by the controller, at least one of a shift pattern and an engine revolutions per minute (RPM) based on the counted control constant,
   wherein in the step of counting the control constant, a counted value of the control constant increases as an entrance temperature value of the executed clutch protection logic increases.

2. The control method according to claim 1, wherein, in the step of executing the one of the clutch protection logics, the respective clutch protection logic is executed if an estimated clutch temperature is higher than the entrance temperature value of the respective clutch protection logic.

3. The control method according to claim 1, wherein in the step of adjusting the at least one of the shift pattern and the engine RPM, the controller adjusts an upshift pattern and a downshift pattern, so that as the control constant increases, upshift is executed at a vehicle speed higher than that of an existing shift pattern and downshift is executed at a vehicle speed lower than that of the existing shift pattern.

4. The control method according to claim 1, wherein in the step of adjusting the at least one of the shift pattern and the engine RPM, the controller adjusts the engine RPM to be lower than an existing engine RPM as the control constant increases.

5. The control method according to claim 1, wherein the controller receives characteristic values for estimating the temperatures of clutches through an engine control unit (ECU) and a transmission of the vehicle.

6. The control method according to claim 5, wherein the characteristic values include the estimated clutch temperatures.

* * * * *